United States Patent [19]

Nemirovsky

[11] Patent Number: 4,986,797
[45] Date of Patent: Jan. 22, 1991

[54] XY POSITIONING APPARATUS

[75] Inventor: Robert Nemirovsky, 117 Hyman Ave., Bay Shore, N.Y. 11706

[73] Assignees: Robert Nemirovsky, Bay Shore; Joseph Deutsch, Commack, both of N.Y.

[21] Appl. No.: 493,284

[22] Filed: Mar. 14, 1990

Related U.S. Application Data

[63] Continuation-in-part of Ser. No. 333,134, Apr. 3, 1989, Pat. No. 4,923,434.

[51] Int. Cl.⁵ .............................................. F16H 7/00
[52] U.S. Cl. ...................................... 474/101; 108/16; 198/502.3
[58] Field of Search ............... 474/101, 109, 111, 112, 474/114, 133, 134, 167, 173; 74/390, 501.5 R; 108/16, 17, 143; 198/502.3

[56] References Cited

U.S. PATENT DOCUMENTS

| | | | |
|---|---|---|---|
| 3,252,594 | 5/1966 | Verrinder | 198/502.3 X |
| 4,571,220 | 2/1986 | Nakano et al. | 474/111 X |
| 4,610,645 | 9/1986 | Donn et al. | 474/112 |
| 4,634,407 | 1/1987 | Holtz | 474/112 |
| 4,688,742 | 8/1987 | Hettich | 474/112 X |

Primary Examiner—Thuy M. Bui
Attorney, Agent, or Firm—Kane, Dalsimer, Sullivan, Kurucz, Levy, Eisele and Richard

[57] ABSTRACT

A positioning apparatus is disclosed which in one embodiment includes two orthogonal tracks, each having a rail, and a carriage coupled to the tracks and having pulleys in frictional engagement with the rails. Rotation of the pulleys causes the carriage and/or one of the tracks to be moved in one of the directions. In another embodiments only one track is used for translation in a single direction.

20 Claims, 13 Drawing Sheets

XY POSITIONING APPARATUS

RELATED APPLICATION

This is a continuation-in-part application to application Ser. No. 333,134, filed Apr. 3, 1989, now Pat. No. 4,923,434, and entitled A HIGH PRECISION DRIVE MECHANISM

BACKGROUND OF THE INVENTION

A. Field of Invention

This invention pertains to an apparatus for precise and repeatable translation of objects along a track. In a particularly advantageous embodiment of the invention, two substantial assemblies are combined within an apparatus for positioning an object accurately and repeatedly along two orthogonal axes.

B. Description of the Prior Art

In the modern age of automation in production and inspection processes, it is often required to position an object in two orthogonal coordinates, such as XY or XZ coordinates. Usually, this is accomplished by stacking two one-axis positioners on top of each other, so that the top positioner is perpendicular to the bottom one. For example, a dual axis Model MT160 stage is constructed by mounting one stage on top of the other as shown on page 56 in catalog 588 by Klinger Scientific, 999 Stewart Avenue, Garden City, N.Y. 11530. The resulting assembly is very bulky. It is difficult to provide precise orthogonality of two positioners. The weight of the top positioner is loading the bearing system of the bottom positioner. Furthermore, such an assembly can not be used in applications. where an object, positioned in two coordinates, must be transparent, for example, for a light source in the inspection process.

So-called open frame tables are designed for applications which require a large center opening through which light can pass or objects can be mounted. For dual axis positioning, open frame tables are also mounted on top of each other. Such an assembly is shown on page 88 in the 1989-1990 catalog "Positioning Systems and Components" by Daedal, Box 500, Harrison City, Pa. 15636. It is obvious that both openings are aligned only in a stationary position. When an object mounted on the upper open frame is positioned in two coordinates, there is always a moving dead zone for passing light, wherever the bottom frame interferes with the opening in the upper frame.

So-called Gantry type XY positioners are assembled from three one-axis positioners. For example, a model GV 88 XY is shown on page 65 in catalog 588 by Klinger Scientific. A single X axis slide is supported and translated by two Y axis slides. Such an assembly is complicated and therefore expensive and very sensitive to an alignment of both Y slides. Other manufacturers control each Y positioner by a separate motor and have problems in synchronizing those motions.

Therefore, there is a need for integral, low profile, inexpensive XY positioners, suitable for applications where an object positioned in two coordinates is transparent for a light or optical beam without a dead zone.

SUMMARY OF THE INVENTION

Briefly, an apparatus for positioning objects consists of a track carrying a rail means, and a carriage disposed on the track and including pulley means with two facing surfaces disposed at a critical angle for frictional engagement thereby with the rail means. Rotation of the pulley means forces the carriage to move with respect to the track. For one-dimensional positioning, the track could be fixed and the object to be moved can be mounted on the carriage, or the carriage could be fixed and the object could be mounted on the movable track. For two-dimensional positioning, a second track with another rail means and a second carriage is coupled to the first track. The second carriage is also equipped with a second pulleys means for engaging the second rail means. Rotation of the two pulley means results in a very smooth, accurate, and repeatable two dimensional motion.

DETAILED DESCRIPTION OF THE INVENTION

Referring now to FIGS. 1-6, an apparatus 10 for positioning an object 12 consists of two substantially identical assemblies 20 and 20' joined by the conventional bolt-and-nut arrangements 14. Assembly 20 consists of a track 24 terminated at the two ends by respective pedestals 26 and 28 for supporting the apparatus 10. Track 24 has a top surface 30 and a bottom surface 32. On the top surface, there are two substantially semicircular parallel grooves 34, 36 each having a rectangular bottom trench 38, 38. In between these grooves, there is a rectangular groove 40, preferably disposed centrally with respect to the grooves 34, 36. Within groove 40, there is a rail 42 which may be, for example a circular rod made of hardened ground steel and secured into a semicircular trench within the groove 40. The rod 42 may be secured within groove 40 by any well known means. Assembly 20 is provided to translate an object in one direction, such as direction X as indicated by arrow 44.

Figure 4:
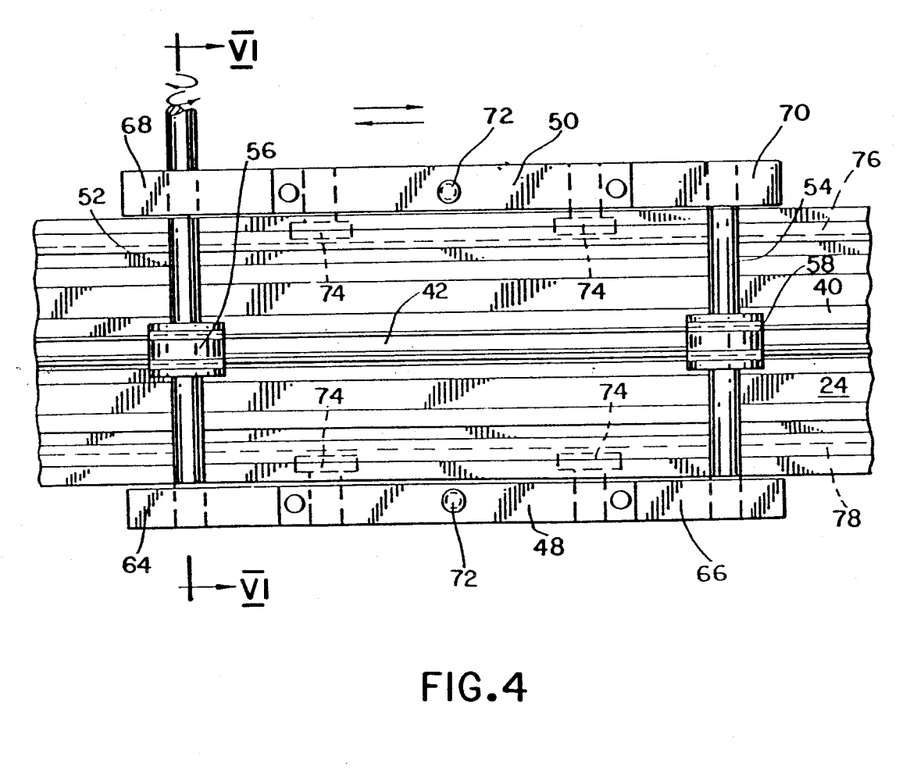
FIG. 4 shows a partial top view of the disassembled apparatus of FIGS. 1-3 with the top assembly removed.
Figure 5:
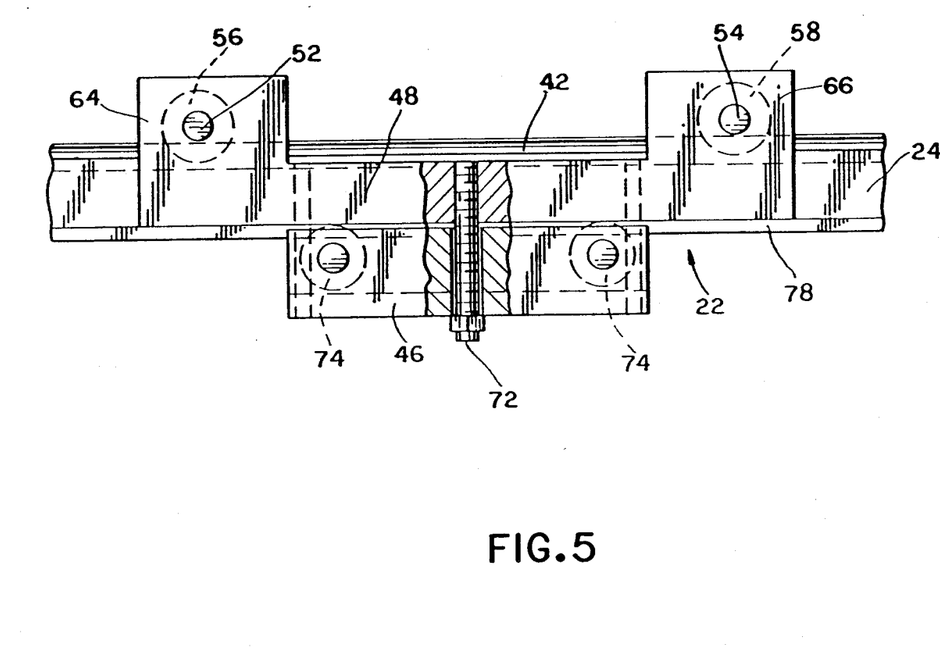
FIG. 5 shows a partial side-sectional view of the apparatus of FIG. 4.
Figure 6:
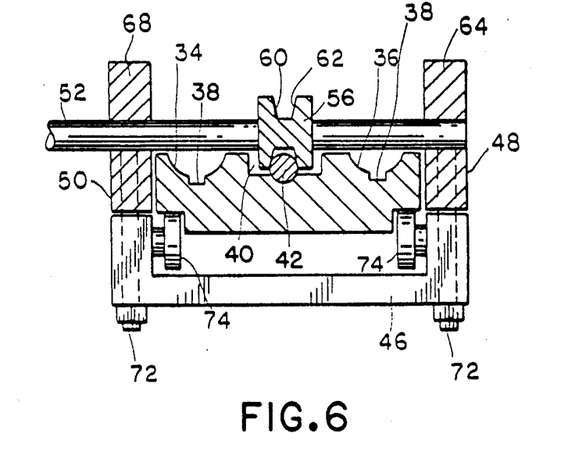
FIG. 6 shows a cross-sectional view taken along line VI—VI in FIG. 4.

As shown in FIGS. 4, 5, & 6, carriage 22 consists of a U-shaped platform 46 and two vertical parallel sidewalls 48 and 50 for mounting two parallel shafts 52 and 54 above track 24. Pulleys 56 and 58 are secured to shafts 52 and 54 respectively by conventional means such as a pin (not shown), or may be made integral with the shafts. Each pulley has two facing walls 60, 62 disposed at a critical angle in the range of 2°–3° with respect to the planes normal to the shafts 52 and 54. Preferably the critical angle is about 2.5° (See FIG. 6). These walls are pitched at the critical angle to frictionally engage rod 42, as described in the pending application Ser. No. 333,134 mentioned above.

Preferably, one of the shafts, such as shaft 52, extends past one of the walls, for example wall 50, so that it can be rotated manually, or it may be coupled to a conventional drive. In this configuration, pulley 56 may be referred to as a driving pulley and pulley 58 may be referred to as a bearing pulley. Rotation of shaft 52, and the pulley 56 mounted thereon causes the carriage to translate along track 24. Of course, it should be understood that either shaft 52 or 54 may be extended past the walls and coupled to a conventional drive. If pulley 58 is chosen to be a driving pulley, pulley 56 becomes a bearing pulley.

As shown in FIGS. 4, 5 and 6, sidewall 48 has two vertical extensions 64 and 66. Similarly, sidewall 50 has two extensions 68 and 70. Shafts 52 and 54 are rotatably mounted in these extensions as shown. The U-shaped platform 46 is secured to side walls 48 and 50 by conventional bolt-and-nut arrangements 72. These bolts and nuts are tightened during assembly to preload the apparatus and provide a tight interfit between the members with no play. Mounted on the U-shaped platform 46 are four rotatable rollers 74 (two on each side), which engage a corresponding rectangular depression 76, 78, disposed on the bottom surface 32 of track 24. These rollers act as guiding bearings for the carriage 22.

Assembly 20' is very similar to assembly 20, except that it is upside down and rotated by 90° with respect to track 24. Thus the assembly 20' includes a track 24' with two parallel semicircular grooves 34' and 36,' and rail 42'. Track 24' also has two depressions 76', 78', and so on. Driving shaft 52' with pulley 56' is rotatably mounted in the side walls' extensions 64' and 68' and shaft 54' with bearing pulley 58' is rotatably mounted in the side walls' extensions 66' & 70'. Four rotatable rollers 74' are mounted on the U-shaped platform 46' for the guidance and support of track 24', when it is translated in the Y direction. Importantly, in the configuration shown in FIG. 1, track 24 is stationary, carriage 22 with assembly 20' is translated in direction X with respect to track 24 by rotating shaft 52, and track 24' is translated in direction Y, indicated by arrow 80 by rotating shaft 52'. Object 12 is mounted on track 24' as shown.

Figure 1:
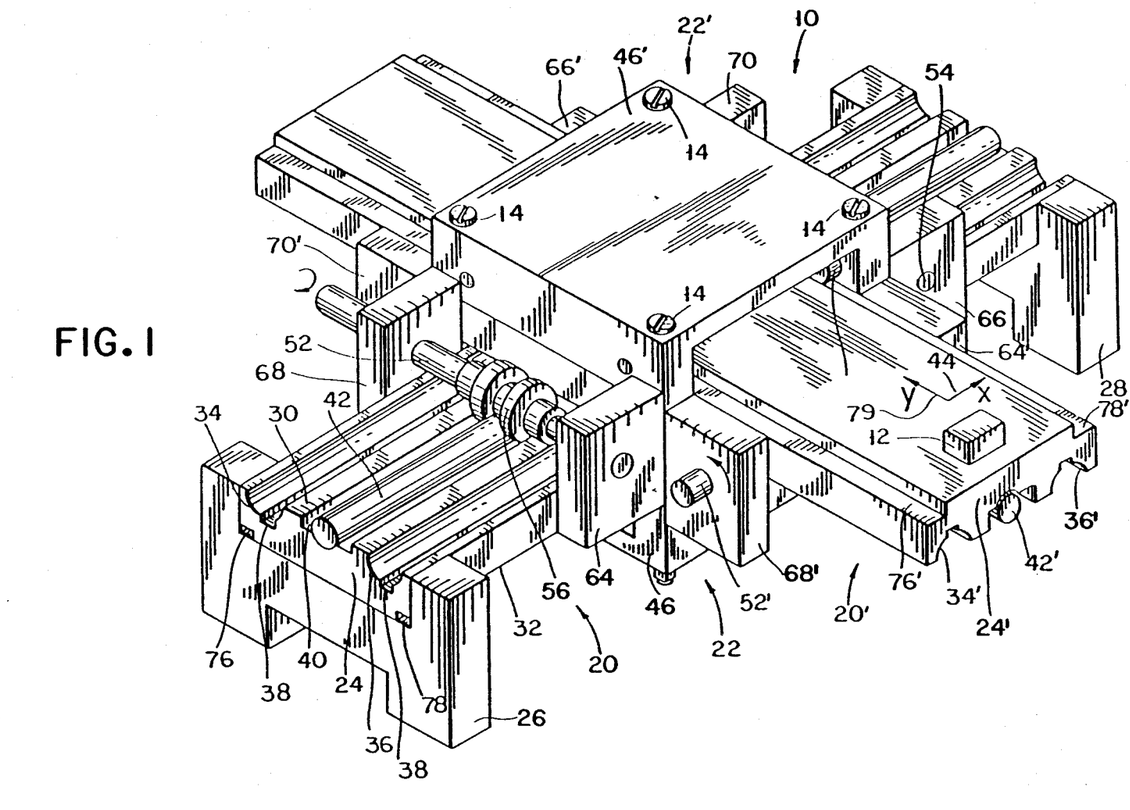
FIG. 1 shows a perspective view of an apparatus for positioning an object in two orthogonal directions constructed in accordance with this invention.
Figure 2:
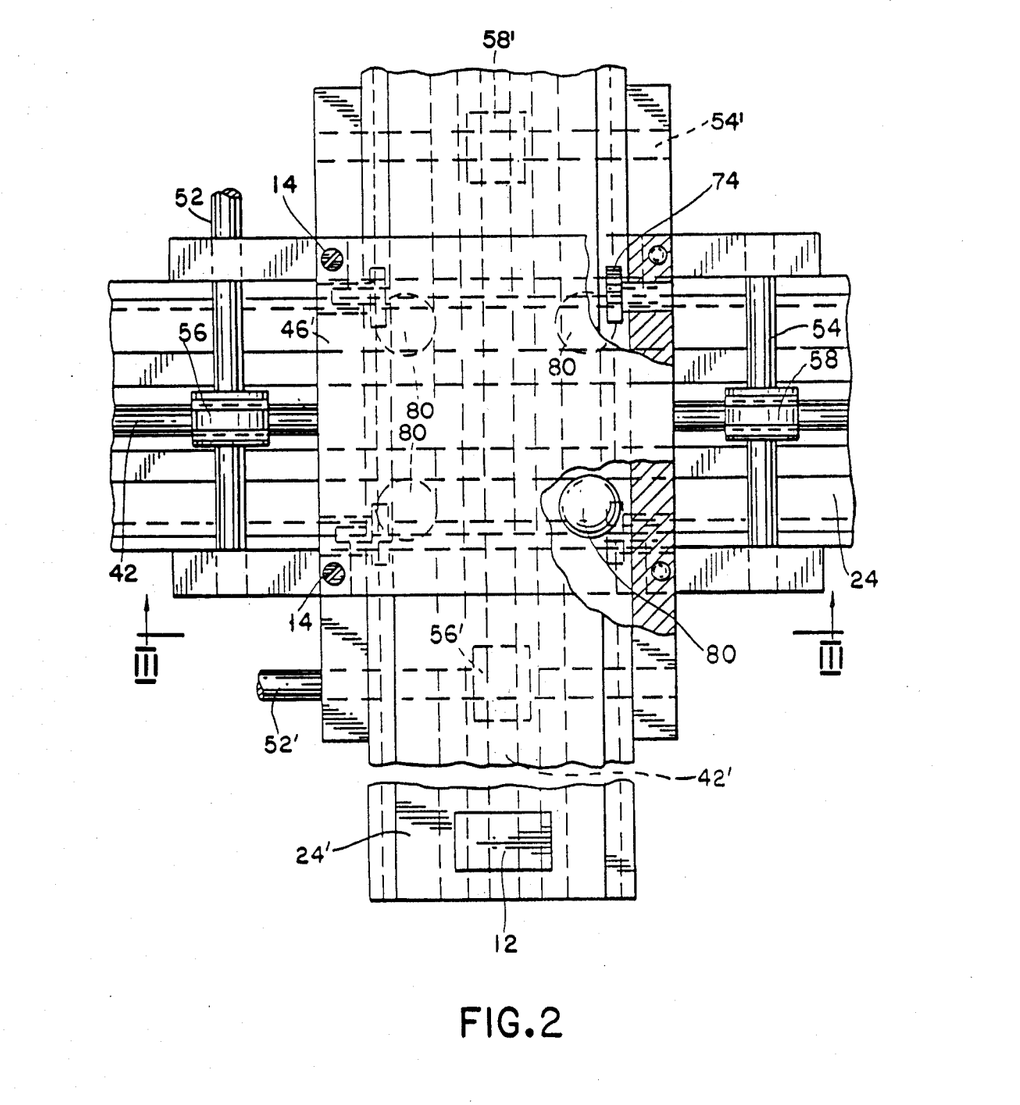
FIG. 2 shows a partial plan view of the apparatus of FIG. 1.
Figure 3:
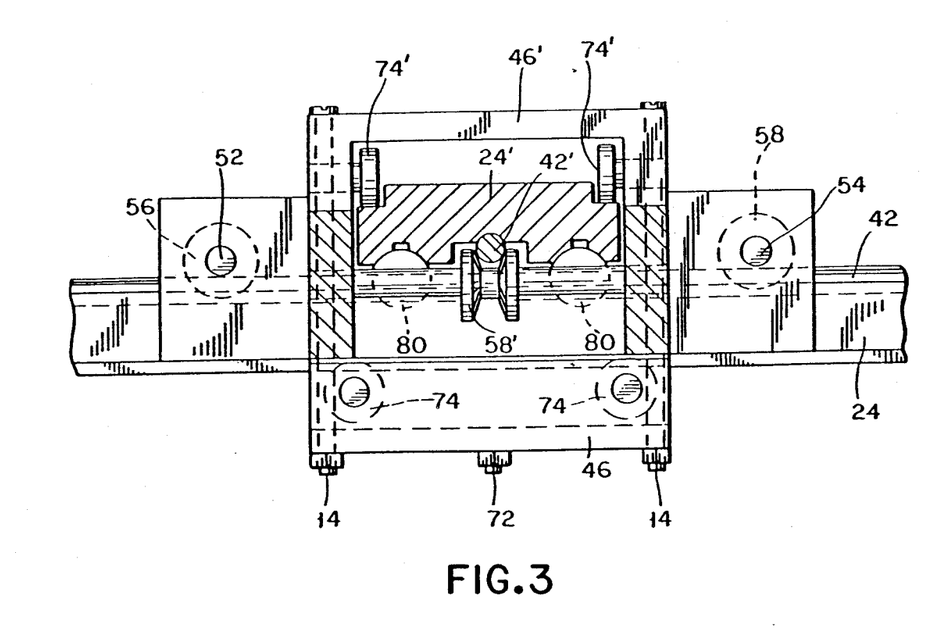
FIG. 3 shows a partial side-sectional view taken along lines III—III in FIG. 2.

The transition between the two orthogonal motions is accomplished through four ground and hardened stainless steel balls 80, nested in grooves 34, 36, 34' and 36', as shown in FIG. 2 and 3. These balls insure that the track 24' moves smoothly and independently. It was found that the trenches 38 in the bottom of grooves 34, 36, 34' and 36' greatly improve the motion of the balls whereby the balls move more smoothly and evenly than without these trenches.

Figure 7:
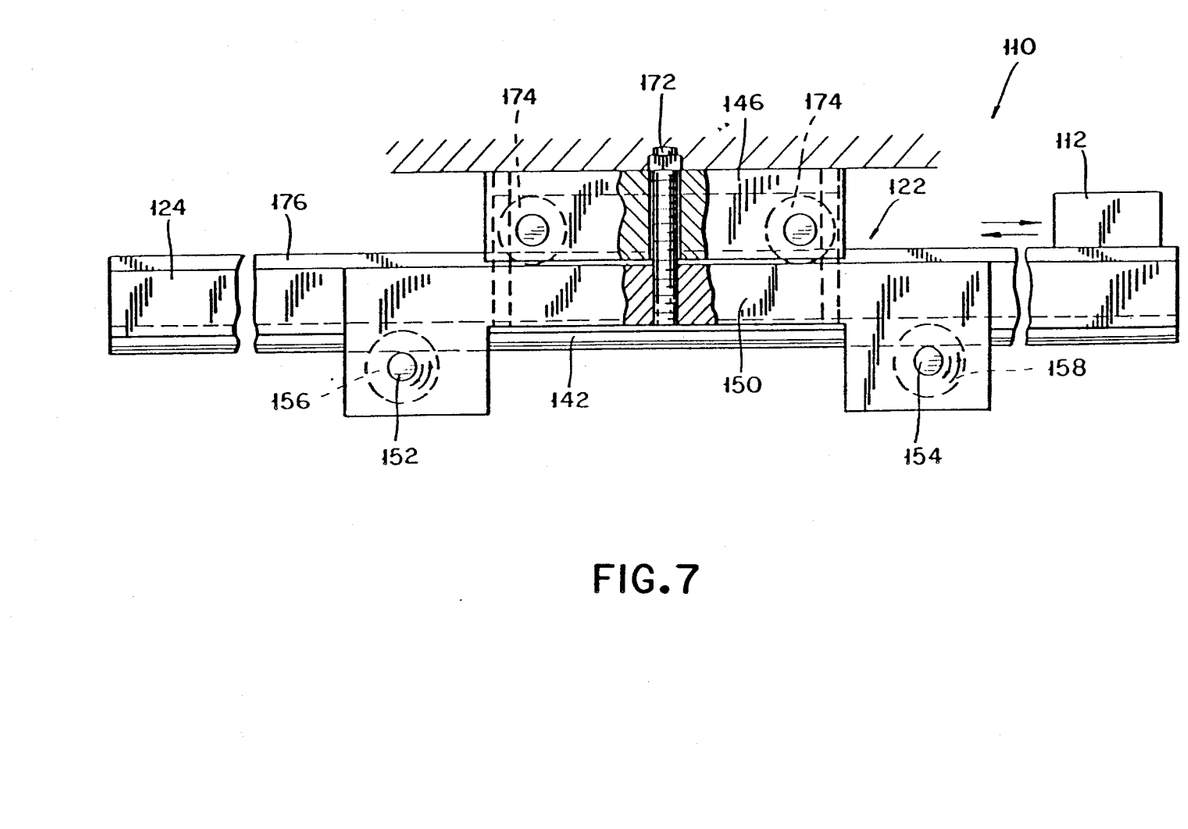
FIG. 7 shows a side view of a first alternate embodiment of the invention for positioning an object in a single dimension with the carriage stationary.

Of course, an apparatus constructed as assembly 20 or 20' may also be used for one-dimensional translation. One such apparatus is shown in FIG. 7. In this Figure, a positioning apparatus 110 is shown, including a stationary carriage 122 which consists of a U-shaped platform 146 secured to side walls 148 and 150 by a nut-and-bolt arrangement 172. (Except as noted, in FIG. 7 elements 152, 154 are identical to elements 52, 54 in FIGS. 1–6, element 156 is identical to element 56, and so on). The apparatus also includes a moving track 124, a pair of pulleys 156, 158 mounted on shafts 152, 154. Mounted on carriage 122, there are also four rollers 174. The pulleys engage rod 142 on track 124. The track also has rectangular depressions 176 and 178 for engagement by rollers 174. Object 112 is now mounted on track 124 and rotation of either shafts 152 or 154 causes the track 124 and object 112 to be translated in a direction parallel to track 124. In this configuration, the steel balls and semicircular grooves on the track are not necessary.

Figure 8:
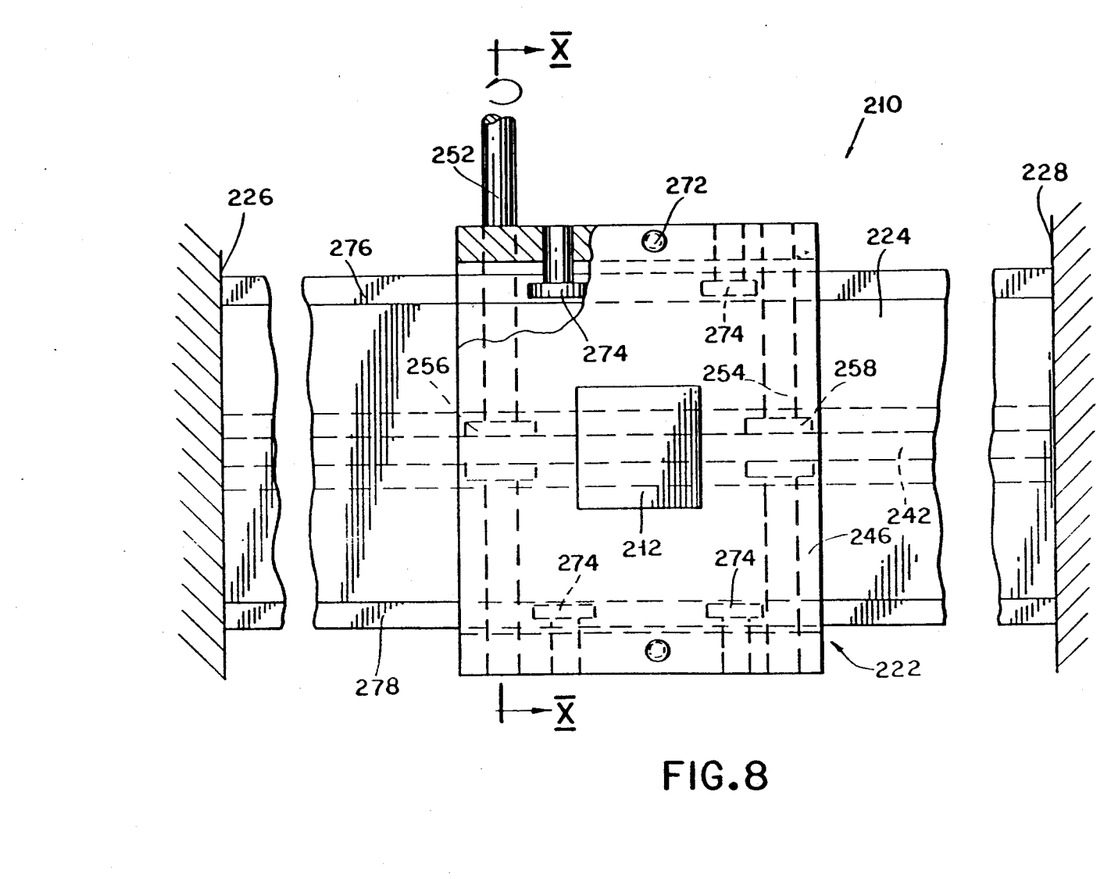
FIG. 8 shows a plan view of a second alternate embodiment of the invention for positioning an object in a single dimension with the track stationary.
Figure 9:
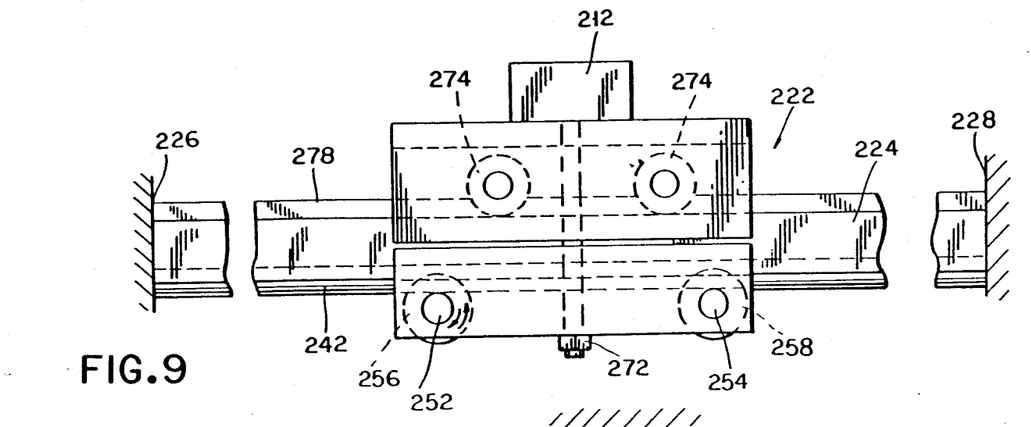
FIG. 9 shows a side view of the embodiment of FIG. 8.
Figure 10:
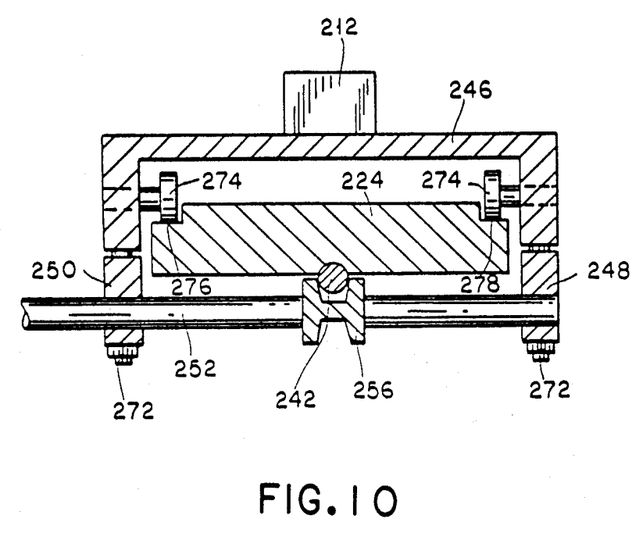
FIG. 10 shows a side-sectional view of the embodiment of FIG. 8 taken along line X—X.

Another alternate embodiment of the invention is shown in FIGS. 8–10, wherein an apparatus 210 for positioning an object 212 includes stationary track 224 mounted between two frames 226, 228, and having grooves 276, 278 on one side and rod 242 on the other. (Again, elements 252, 254 and so on in FIGS. 8–10 are identical to elements 52, 54 in FIGS. 1–6, unless otherwise noted). Rollers 274 engage the grooves 276, 278, while pulleys 256, 258 engage rod 242. Rotation of either pulley causes carriage 222 to translate along track 224. Object 212 is mounted on carriage 222.

Figure 11:
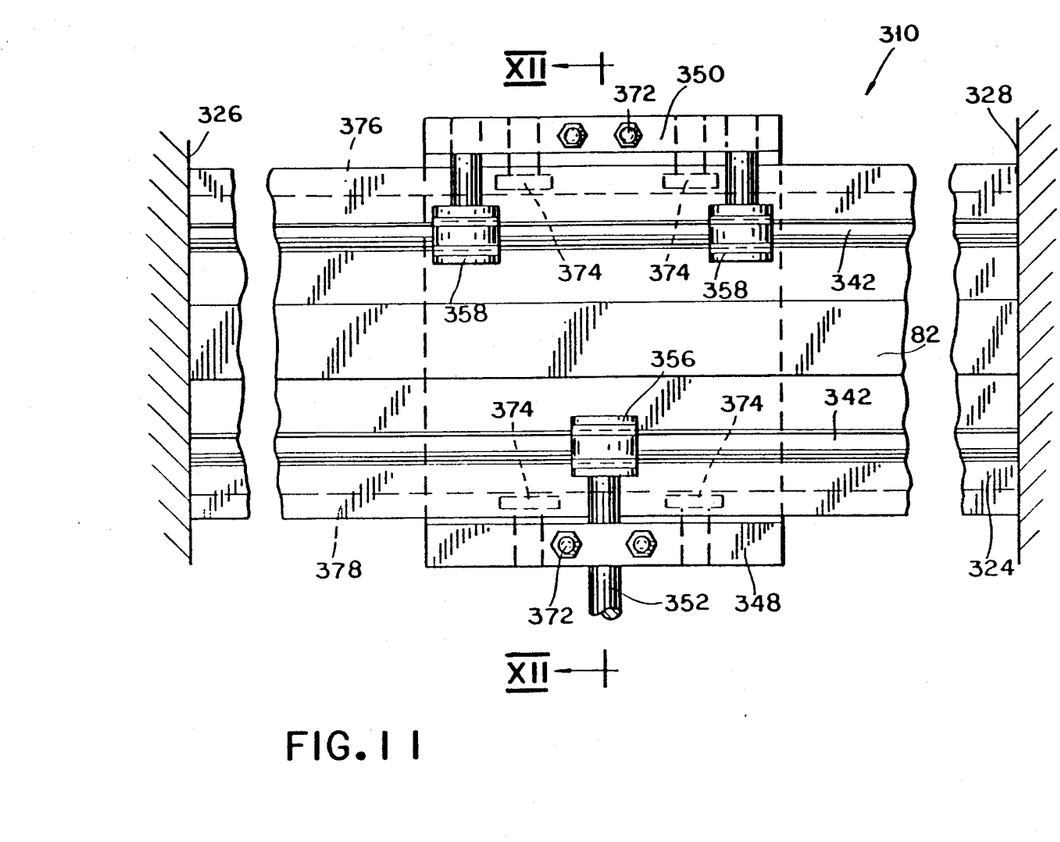
FIG. 11 shows a plan view of the third alternate embodiment of the invention for positioning an object in a single dimension for long travel lengths.
Figure 12:
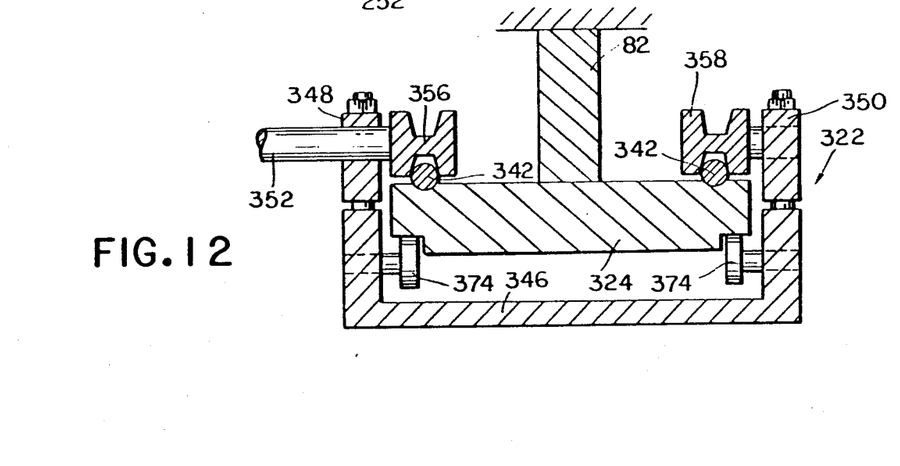
FIG. 12 shows a side-sectional view of the embodiment of FIG. 11 taken along line XII—XII.

A further alternate embodiment of the invention is shown in FIGS. 11–12 especially suitable for the applications where an object is translated along a long track (i.e. over 12 inches). In such applications undesirable bending of a long stationary track may occur under large loads. Therefore, the long track may be reinforced, for example with a rib 82 disposed at the center of track 324. A carriage 322 is shown under track 324 only for the sake of clarity. Apparatus 310 may be operated upside down, or standing on rib 82. Track 324 has two rails 342, one on each side, and driving pulley 356 with a drive shaft 352 is rotatably mounted in the center or the carriage sidewall 348. Two bearing pulleys 358 are rotatably mounted on the second wall of a carriage 350 as close to the edges of a carriage as possible for maximum support of the carriage 322. All other elements are identical to the elements of apparatus 110 and 210. Importantly, the rails 142, 242, 342 in the apparatus 110, 210 and 310 are secured to the track, and no rectangular groove is required. For very long travel lengths, track 324 may be made in short sections and secured to one long rib 82 for simpler manufacturing. The rails 342 may be either assembled with the track sections or made in one piece coextensive with the rib.

Figure 13:
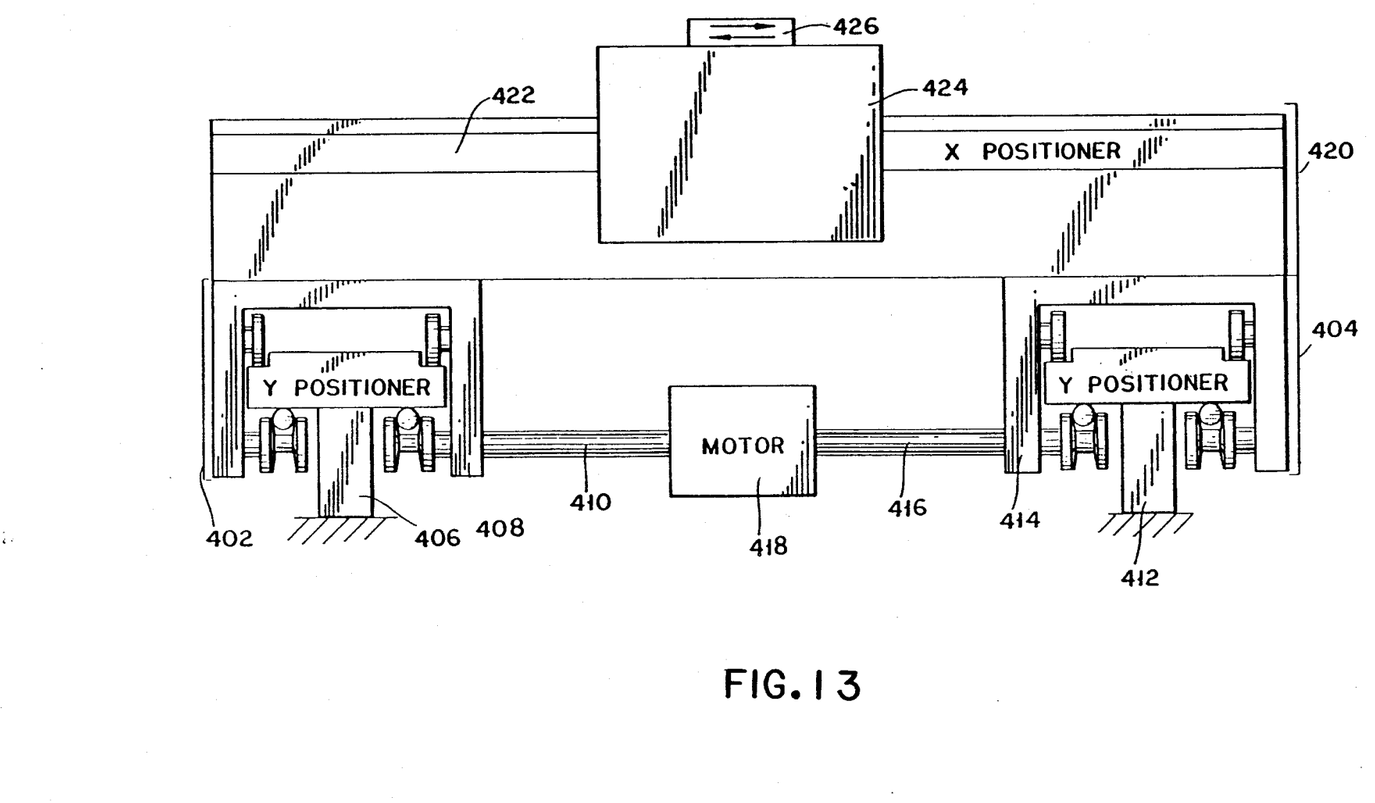
FIG. 13 shows schematically a first embodiment of a gantry-type positioner constructed in accordance with this invention.

The principles and structures described above may be used in a gantry-type positioning device as well. For example, as shown in FIG. 13, two identical positioners 402, 404 may be placed in parallel, each having a structure similar to the structure shown in FIGS. 11 and 12. For example, positioner 402 includes a stationary T-shaped track 406, a carriage 408 and a drive shaft 410. Similarly positioner 404 includes a T-shaped track 412, a carriage 414 and a drive shaft 416. The two drive shafts 410, 416 are connected to a common motor 418 which rotates the shafts simultaneously in the same direction to translate the positioners along tracks 406 and 412. Mounted transversely on carriages 408 and 414 is a another positioner 420 also constructed in a manner similar to the positioner of FIGS. 11 and 12. Thus third positioner 410 includes a transversal track 422 with a carriage 424 for positioning an object 426.

Figure 14:
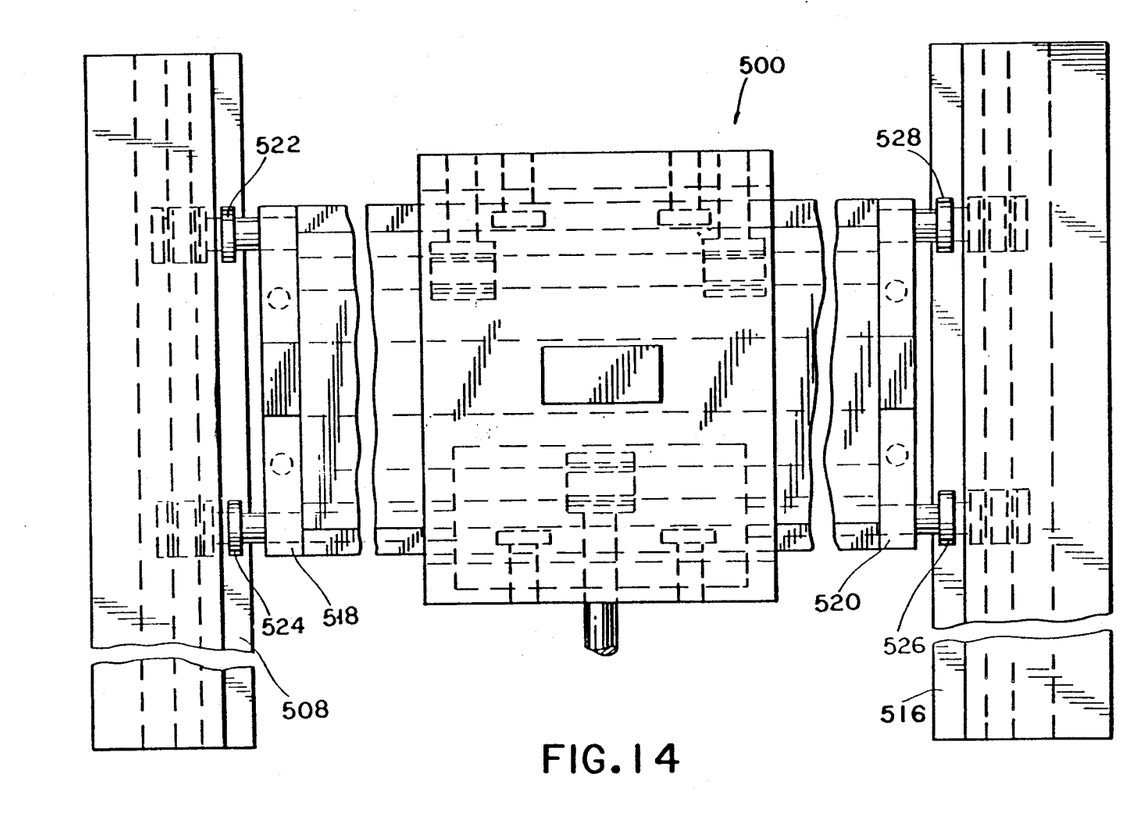
FIG. 14 shows a plan view for a second embodiment of a gantry-type positioner constructed in accordance with this invention.
Figure 15:
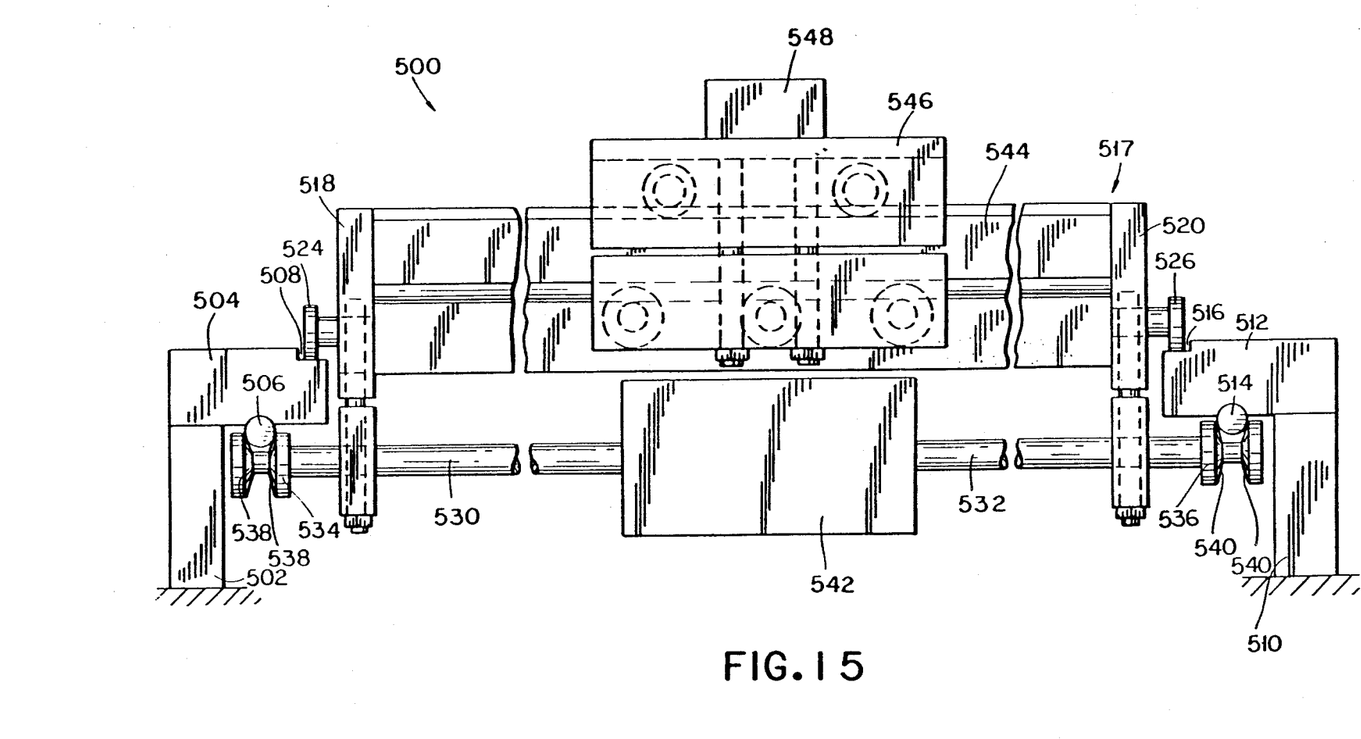
FIG. 15 shows a side view of the embodiment of FIG. 15.

A simplified version of a gantry-type positioning device is shown in FIGS. 14 and 15. This version is similar to the one shown in FIG. 13. The device 500 includes a stationary rib 502, holding a track 504. The track 504 carries on its lower surface a circular rail 506, and on its upper surface has a groove or channel 508. The device 500 also includes a second stationery rib 510 in parallel with first rib 502. Secured to rib 510 is a second track 512 facing track 504 and having a lower rail 514 and an upper groove 516. A common carriage 517 straddles the two tracks 504, 512, and has two parallel substantially vertical walls 518, 520. Rollers 522 and 524 are rotatably mounted on wall 518 to ride in groove 508. Similarly rollers 526, 528 are mounted on wall 520 to ride in groove 516. Carriage 517 also has two drive shafts 530, 532 passing through suitable holes made in walls 518, 520 respectively. Drive shaft 530 supports a driving pulley 534 which engages rail 508. Shaft 532 supports a driving pulley 536 which engages rail 514. Preferably the driving pulleys have inner circumferential walls such as 538 and 540 which are disposed at the critical angle as defined above. The two shafts are coupled to a common motor 542 whereby when the two shafts are driven simultaneously by the motor, the carriage 517 is translated along tracks 504, 512. On a top surface of the carriage there is a transversal track 544. A carriage 546 identical to carriage 346 shown in FIGS. 11 and 12 rides on track 544 for positioning an object 548.

It should be understood that all the embodiments operate in any orientation and that directional terms such as up, down, top or bottom have been used merely to facilitate the description of the invention. Obviously numerous modifications can be made to the invention without departing from its scope as defined in the appended claims.

I claim:
1. A positioning apparatus comprising:
   a. track means including a rail extending in a preselected direction said track means having first and second surfaces; and
   b. carriage means having a rotatable pulley in frictional engagement with said rail along said first surface to move said carriage when said pulley is rotated, and said carriage further having first and second bearing means for engaging said second surface, said first and second bearing means being spaced along an axis perpendicular to said rail;
   whereby an object disposed on one of said track means and said carriage means is positioned in said preselected direction by rotating said pulley.
2. The positioning apparatus of claim 1 wherein said track means is fixed and said carriage moves with respect to said track.
3. The positioning apparatus of claim 1 wherein said carriage means is fixed and said track means moves with respect to said carriage.
4. The positioning apparatus of claim 1 wherein said rail consists of a rod secured to said track means.
5. A positioning apparatus for positioning an object in a first direction comprising:
   a. track means extending in said first direction and having:
      i. two opposed ends attached to a frame;
      ii. first surface extending along said track means; and
      iii. rail means substantially coextensive with said track means and secured to said first surface; and
   b. a carriage means movably disposed on said track means for holding said object, said carriage means including
      i. first and second opposed wall sections;
      ii. shaft means rotatably supported by said wall sections; and
      iii. pulley means secured to said shaft means and in frictional engagement with said rail means;
   said carriage means being translated along said track means when said pulley means and said shaft means are rotated
6. The apparatus of claim 5 wherein said pulley means include two opposed walls disposed at a critical angle.
7. The apparatus of claim 5 wherein said critical angle is in the range of 2°-3° with respect to a plane normal to said shaft.
8. The apparatus of claim 5 wherein said track means includes a second surface opposed to said first surface, and groove means disposed on said second surface, and said carriage means includes a platform means and roller means rotatably supported by said platform means.
9. The apparatus of claim 8 wherein said carriage means includes securing means for securing said platform means to said first and second wall section to urge said roller means against said groove means.
10. An apparatus for positioning an object along a first and a second direction, said first and second directions being orthogonal, said apparatus comprising:
    a. a platform having:
       i. first and second rotatable shaft means disposed perpendicularly to said first and second direction respectively; and
       ii. first and second pulley means secured to said first and second shaft means respectively;
    b. first track means extending in said first direction and having:
       i. a first track first surface having rail means in frictional engagement with said first pulley means;
    c. second track means extending in said second direction and having:
       ii. a second track first surface facing said first track means and having rail means in frictional engagement with said second pulley means; and
    d. coupling means for coupling said first and second tracks.
11. The apparatus of claim 10 wherein said platform has first and second wall section means for holding said first and second shaft means respectively.
12. The apparatus of claim 11 wherein:
    a. said platform further includes third wall section means and first and second roller means disposed on said third wall section means;
    b. said first track means has a first track second surface opposite said first track first surface with groove means engaging said first roller means; and
    c. said second track means has a second track second surface opposite said second track first surface with groove means engaging said second roller means.
13. The apparatus of claim 12 wherein said platform means includes securing means for securing said third wall section means to said first and second wall section means.

14. The apparatus of claim 10 wherein said first surfaces include coupling groove means and said coupling means include a plurality of balls rotatably disposed in said coupling groove means.

15. The apparatus of claim 10 wherein said first track means is fixed to a frame.

16. The apparatus of claim 15 wherein said object is mounted on said second track means and said platform, and first and second track means cooperate to translate said object, said platform, and said second track in said first direction when said first pulley means is rotated, and to translate said second track in said second direction when said second pulley means is rotated.

17. The apparatus of claim 10 wherein each said shaft means includes two parallel shafts and each said pulley means includes two pulleys secured to one of said shafts.

18. The apparatus off claim 17 wherein said rail means comprises a round rod secured to the corresponding track means, and said pulleys each have two opposed pulley surfaces.

19. The apparatus of claim 18 wherein said pulley surfaces are disposed at an angle in the range of 2°–3° with respect to a plane normal to the corresponding shaft.

20. The apparatus of claim 19 wherein said critical angle is about 2.5°.

* * * * *